(12) United States Patent
Balardeta et al.

(10) Patent No.: US 8,446,255 B2
(45) Date of Patent: *May 21, 2013

(54) CIRCUIT FOR TRANSMITTING A RFID SIGNAL

(75) Inventors: Joseph Balardeta, Encinitas, CA (US); Scott Denton, Carlsbad, CA (US)

(73) Assignee: Callaway Golf Company, Carlsbad, CA (US)

( * ) Notice: Subject to any disclaimer, the term of this patent is extended or adjusted under 35 U.S.C. 154(b) by 452 days.

This patent is subject to a terminal disclaimer.

(21) Appl. No.: 12/950,540

(22) Filed: Nov. 19, 2010

(65) Prior Publication Data

US 2012/0126946 A1    May 24, 2012

(51) Int. Cl.
*H04Q 5/22* (2006.01)

(52) U.S. Cl.
USPC ............... 340/10.1; 340/539.3; 340/636.1

(58) Field of Classification Search
USPC .......................................... 340/10.1
See application file for complete search history.

(56) References Cited

U.S. PATENT DOCUMENTS

| | | |
|---|---|---|
| 6,224,493 B1 | 5/2001 | Lee et al. |
| 6,402,634 B2 | 6/2002 | Lee et al. |
| 6,431,990 B1 | 8/2002 | Manwaring |
| 6,638,175 B2 | 10/2003 | Lee et al. |
| 6,821,209 B2 | 11/2004 | Manwaring et al. |
| 7,163,468 B2 | 1/2007 | Gibbs et al. |
| 7,163,470 B2 | 1/2007 | Galloway et al. |
| 7,166,038 B2 | 1/2007 | Williams et al. |
| 7,214,143 B2 | 5/2007 | Deshmukh |
| 7,252,600 B2 | 8/2007 | Murphy et al. |
| 7,258,626 B2 | 8/2007 | Gibbs et al. |
| 7,258,631 B2 | 8/2007 | Galloway et al. |
| 7,273,419 B2 | 9/2007 | Evans et al. |
| 7,413,520 B1 | 8/2008 | Hocknell et al. |
| 2002/0174153 A1* | 11/2002 | O'Toole et al. ............... 708/252 |
| 2009/0075761 A1 | 3/2009 | Balardeta et al. |
| 2009/0318779 A1* | 12/2009 | Tran ............................ 600/301 |

* cited by examiner

*Primary Examiner* — Brian Zimmerman
*Assistant Examiner* — Omer S Khan
(74) *Attorney, Agent, or Firm* — Michael A. Catania; Sonia Lari; Rebecca Hanovice

(57) ABSTRACT

A circuit for transmitting a RFID signal while conserving the battery power for a circuit in continuous operation is disclosed herein. The circuit includes a RFID component, a microprocessor, an accelerometer, a gyroscope and a battery. The battery preferably has no more than 225 milliamp hours of power. The accelerometer is preferably a multiple axis accelerometer. The circuit is preferably utilized with a device for shot tracking.

19 Claims, 8 Drawing Sheets

CIRCUIT FOR TRANSMITTING A RFID SIGNAL

CROSS REFERENCES TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of the Invention

The present invention relates to shot tracking. More specifically, the present invention relates to a method and circuit for transmitting a RFID signal while conserving battery power.

2. Description of the Related Art

Reducing power consumption in most portable electronic devices is important but it is especially important in electronic devices that are not rechargeable or have replaceable batteries, and are operated continuously, that is the device is always active in some mode. Such devices are essentially consumables since once the battery power is exhausted the device is no longer useful.

An obvious solution would be, if possible, to program the electronic device with sufficient intelligence to activate and deactivate as needed. However, many modern electronic devices require more sophistication than simple activation and deactivation, and the act of activating a device after deactivation may only add to the power depletion. Further, many modern electronic devices include various components that have varying power requirements in order to function properly in continuous operation.

The prior art is lacking in a circuit to conserve battery power while sensing for motion and then transmitting the information pertaining to the sensed motion using a radiofrequency component.

BRIEF SUMMARY OF THE INVENTION

The present invention provides a novel solution to the problem of conserving battery power in a continuous operation circuit utilized for transmitting a RFID signal. The solution imparts intelligence to the circuit to conserve power while allowing the components of the circuit to function properly for a continuous operation device.

One aspect of the present invention is a circuit for transmitting a RFID signal while conserving the battery power for a circuit in continuous operation. The circuit comprises a battery having no more than 225 milliamp hours of power, a microprocessor in electrical communication with the battery, a multi-axis accelerometer for determining movement, a gyroscope for monitoring movement, and a radiofrequency component in electrical communication with the microprocessor. The microprocessor operates during a sleep mode, a sampling mode, an analysis mode, a monitoring mode and a transmission mode. The multi-axis accelerometer determines movement, monitors movement and communicates the movement to the microprocessor. The multi-axis accelerometer is in electrical communication with the microprocessor, the power for the multi-axis accelerometer is drawn from the battery and the multi-axis accelerometer is only active during the sampling mode, the analysis mode and the monitoring mode. The gyroscope is in electrical communication with the multi-axis accelerometer, the gyroscope only activated when triggered by the multi axis-accelerometer. The radiofrequency component is in electrical communication with the microprocessor. The radiofrequency component operates at 2.4 giga-Hertz and the power for the radiofrequency component is drawn from the battery. The radiofrequency component operates during a transmission mode, transmitting a signal from the radiofrequency component during the transmission mode, the signal comprising data related to the movement monitored by the multi-axis accelerometer. The circuit consumes less than 600 nano-amps during the sleep mode, and the sleep mode has a time period ranging from 10 seconds to 30 seconds. The circuit consumes less than 15 micro-amps during the sampling mode. The circuit consumes less than 50 micro-amps during the analysis mode. The circuit consumes less than 200 micro-amps during the monitoring mode. The circuit consumes less than 12 milli-amps during the transmission mode.

Another aspect of the current invention is a method for transmitting a RFID signal while conserving the battery for a circuit in continuous operation. The method comprises activating a microprocessor from a sleep mode to a sampling mode, the microprocessor in electrical communication with a multi-axis accelerometer, a gyroscope, a radiofrequency component, a radiofrequency component, and a battery having no more than 225 milli-amp hours of power. The method further comprises activating the multi-axis accelerometer to determine movement during the sampling mode, the power for the multi-axis accelerometer drawn from the battery. The method comprises determining with the multi-axis accelerometer if there is movement during an analysis mode, monitoring movement with the multi-axis accelerometer during a monitoring mode and communicating the movement to the microprocessor. The method further comprises triggering the gyroscope during the monitoring mode, monitoring movement with the gyroscope during the monitoring mode and communicating the movement to the microprocessor. Also, the method comprises transmitting a signal from the radiofrequency component during a transmission mode, the signal comprising data related to the movement monitored by the multi-axis accelerometer, the radiofrequency component operating at 2.4 giga-Hertz, the power for the radiofrequency component drawn from the battery. The circuit is in continuous operation, wherein the circuit consumes less than 600 nano-amps during the sleep mode, the sleep mode having a time period ranging from 5 seconds to 45 seconds. The circuit consumes less than 15 micro-amps during the sampling mode, less than 50 micro-amps during the analysis mode, less than 200 micro-amps during the monitoring mode, and less than 12 milli-amps during the transmission mode.

The present invention further comprises a method for conserving power for a shot tracking device for attachment to a golf club. The method involves transmitting a plurality of signals from a shot tracking device attached to a golf club. The shot tracking device comprises a housing, a battery disposed within the housing, a sensor, and a plurality of board components disposed on a circuit board, the plurality of board components including a microprocessor. The shot tracking device is enabled to determine that a threshold number of signals has been transmitted by the shot tracking device and a receipt signal has not been received by the shot tracking device, which in turn deactivates the shot tracking device until a predetermined event occurs. The threshold number of signals ranges from 5 to 50. The signal is sent to a receiver for further processing and storage, and then for uploading to a Website for shot tracking.

Having briefly described the present invention, the above and further objects, features and advantages thereof will be recognized by those skilled in the pertinent art from the following detailed description of the invention when taken in conjunction with the accompanying drawings.

DETAILED DESCRIPTION OF THE INVENTION

Figure 1:
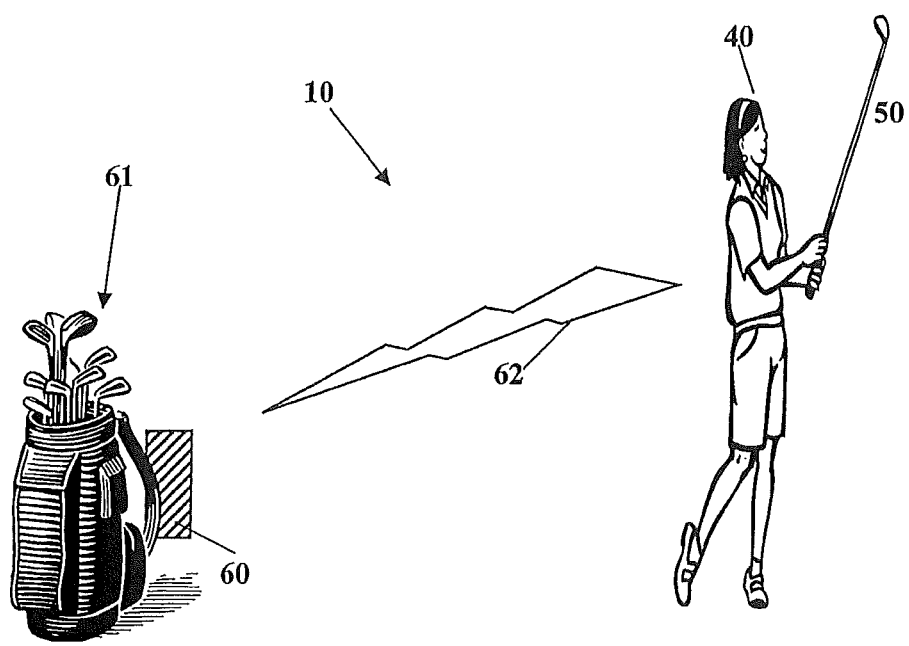
FIG. 1 is an illustration of a golfer using a golf club utilizing a device with a power-saving circuit having a radiofrequency transmission component.

A system for shot tracking is illustrated in FIG. 1. A golfer 40 strikes a golf ball with a golf club 50. The golf club 50 includes a device 20 preferably positioned within a grip. The device 20 includes a circuit 25 for transmitting a RFID signal while conserving the battery power of the device 20. The RFID signal 62 is preferably transmitted to a receiver 60 attached to a golf bag 61. As discussed in greater detail below, the RFID signal preferably comprises the golf club 50 used by the golfer and golf swing information.

The receiver 60 is preferably a GPS device such as disclosed in Balardeta et al., U.S. Patent Publication Number 20090075761 for a Golf GPS Device And System, which is hereby incorporated by reference in its entirety. Alternatively, the receiver is a personal digital assistant (PDA), "smart phone", mobile phone, or other similar device. However, those skilled in the pertinent art will recognize that the receiver may be any type of receiver capable of receiving and storing signals from the device 20.

Figure 2:
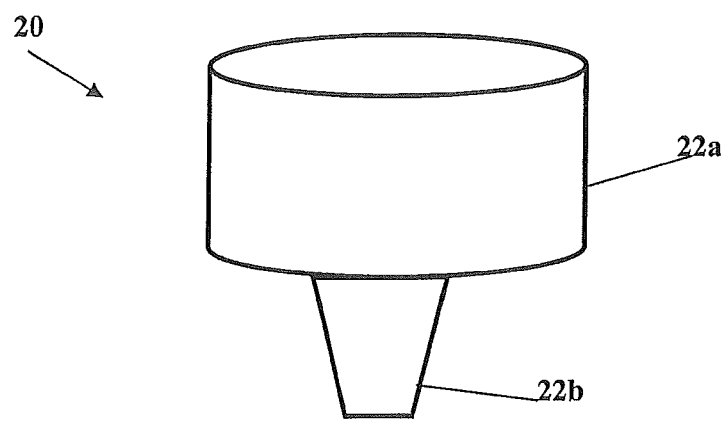
FIG. 2 is a perspective view of a device with a power-saving circuit having a radiofrequency transmission component.

FIG. 2 illustrates the device 20 including the main body 22a and a projection 22b. The projection 22b preferably is placed within an aperture of a grip (not shown) of a golf club 50. The projection body 22b preferably has a length that ranges from 1 millimeter ("mm") to 5 mm. The main body 22a preferably has a diameter, D, that ranges from 20 mm to 25 mm.

Figure 3:
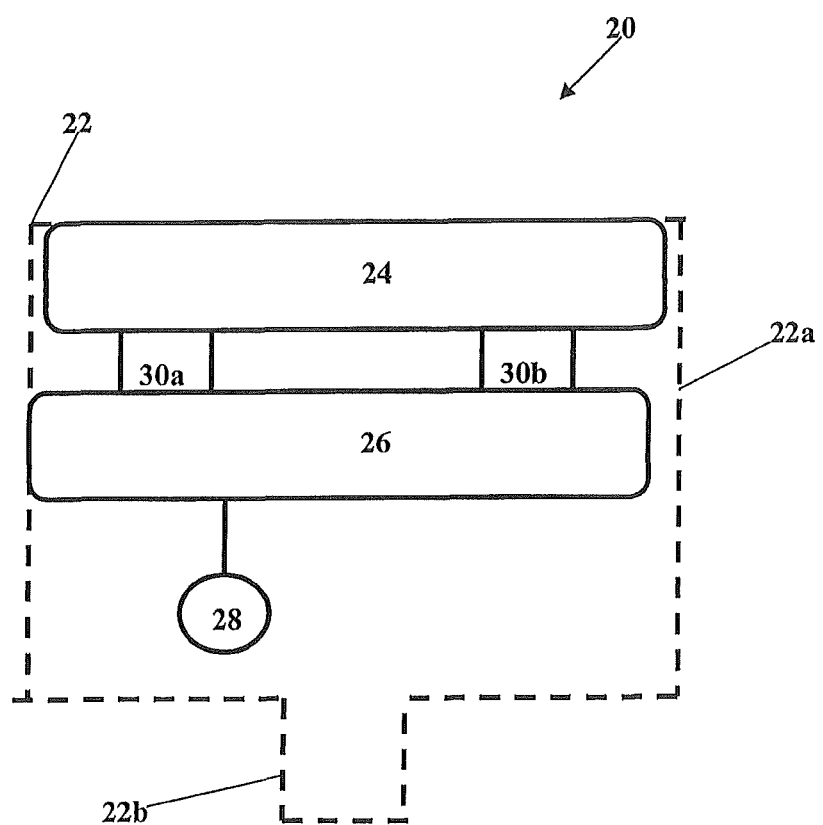
FIG. 3 is an interior view of a device with a power-saving circuit having a radiofrequency transmission component.

The interior components of the device 20 are illustrated in FIG. 3. The interior components are preferably held within a housing 22 of the device 20. The interior components comprise a battery 24, a circuit board 26 having an accelerometer 28, a gyroscope 29, a microprocessor 30a and a RFID component 30b. Preferably the housing 22 is composed of a rubberized material formed around the battery 24 and the circuit board 26. In an alternative embodiment, the housing 22 is composed of an epoxy material formed around the battery 24 and the circuit board 26.

Figure 4:
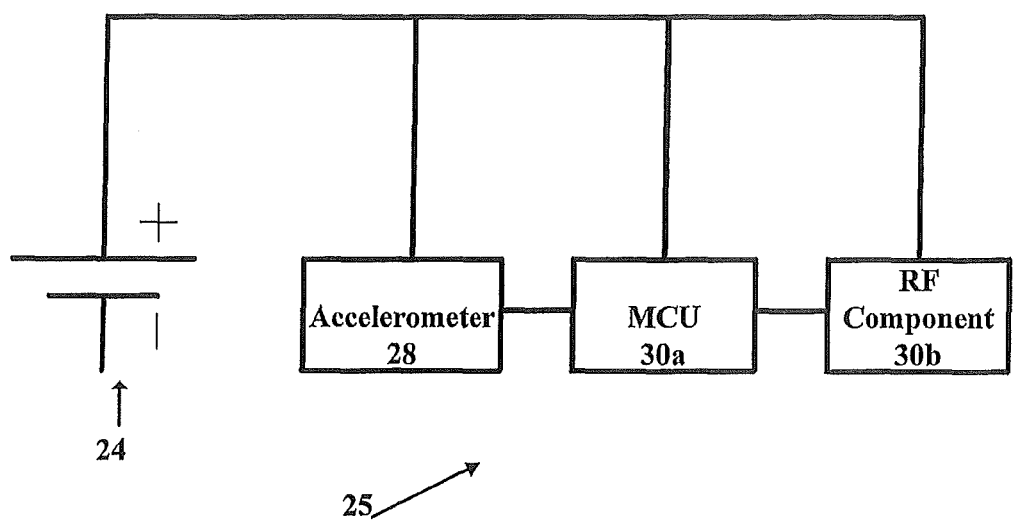
FIG. 4 is an illustration of the circuit diagram of a power-saving circuit having a radiofrequency transmission component.

FIG. 4 illustrates a circuit diagram of a preferred embodiment of the present invention. A circuit 25 includes a battery 24, an accelerometer 28, a gyroscope 29, a microprocessor 30a and an RFID component 30b. The battery 24 is preferably a CR2032 lithium battery having 225 milliamp hours of power. In a device 20, under continuous operation, the battery 24 should provide power for an estimated five years of normal use of the device 20. The microprocessor 30a is preferably a MC9S08QG8/4 microprocessor from Freescale Semiconductor. The accelerometer 28 is preferably a LIS3DH ultra low-power high-performance 3-axes nano accelerometer from ST Microelectronics, which has a 32 first in first out (FIFO) buffer. The RFID component is preferably an RF24L01 single chip 2.4 gigaHertz transceiver from Nordic Semiconductor.

Figure 5:
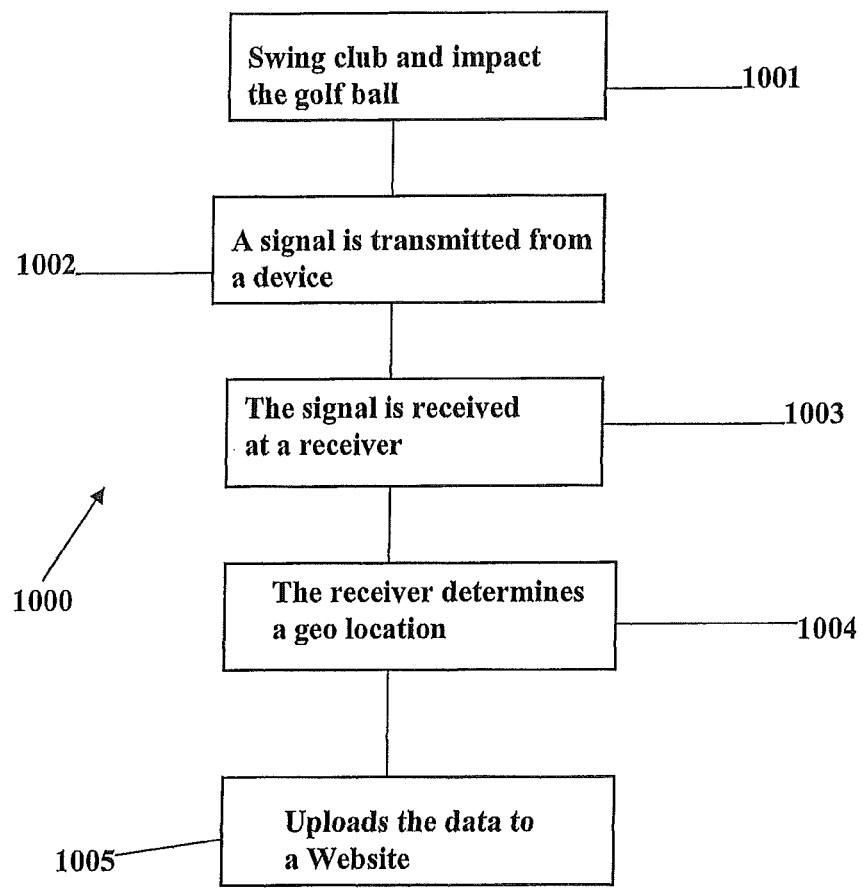
FIG. 5 is a flow chart of a method for shot tracking utilizing a device with a power-saving circuit having a radiofrequency transmission component.
Figure 5A:
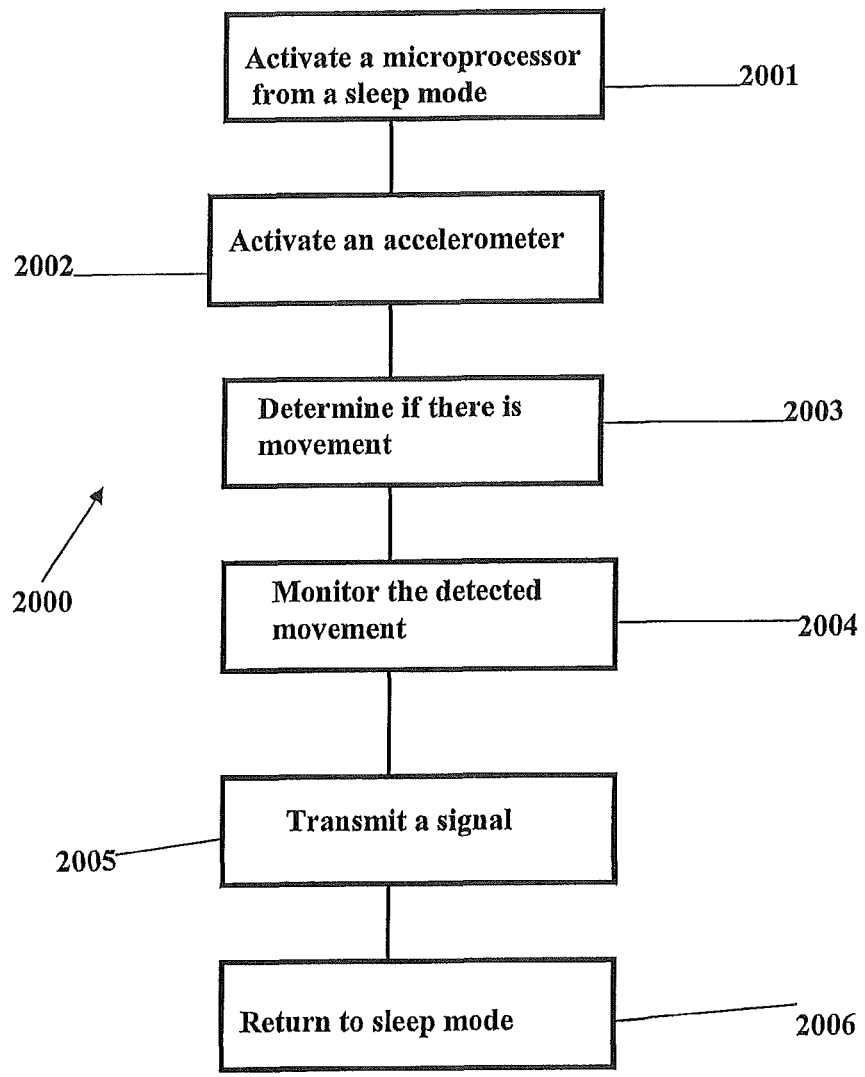
FIG. 5A is a flow chart for a preferred method for conserving power in a circuit having a radiofrequency transmission component.

A method 2000 for conserving power for the circuit 25 is set forth in FIG. 5A. At block 2001, the microprocessor 30a is activated from a sleep mode to a sampling mode. A preferred time period for the sleep mode is between ten to fifteen seconds. The circuit 25 preferably consumes less than 600 nano-amps during the sleep mode. The time period for the sleep mode is sufficiently long enough to provide power savings for the battery 24 but short enough to capture any activity for the circuit 25. At block 2002, during the sampling mode, the microprocessor 30a activates the accelerometer 28. The circuit 25 preferably consumes less than 15 micro-amps during the sampling mode. During the sampling mode, the accelerometer 28 is determines if there is any movement or change from the last sampling mode. At block 2003, the accelerometer 28 determines if there is motion activity during an analysis mode. The circuit 25 preferably consumes less than 50 micro-amps during the analysis mode. At block 2004, the accelerometer monitors the motion activity during a monitoring mode and communicates the motion activity to the microprocessor 30a. If triggered, the gyroscope 29 is activated by the accelerometer 28. The gyroscope 29 monitors movement during the monitoring mode and communicates that movement to the microprocessor 30a. The circuit 25 preferably consumes less than 200 micro-amps during the monitoring mode. At block 2005, the radiofrequency component 30b transmits a signal during a transmission mode. The signal comprises data related to the motion activity monitored by the accelerometer 28. The radiofrequency component 30b preferably operates at 2.4 giga-Hertz and the power for the radiofrequency component 30b is drawn from the battery 24. The circuit 25 preferably consumes less than 12 milli-amps during the transmission mode. At block 2006, the circuit 25 returns to a sleep mode. The gyroscope operates at or less than 5 milli-amps.

Figure 6:
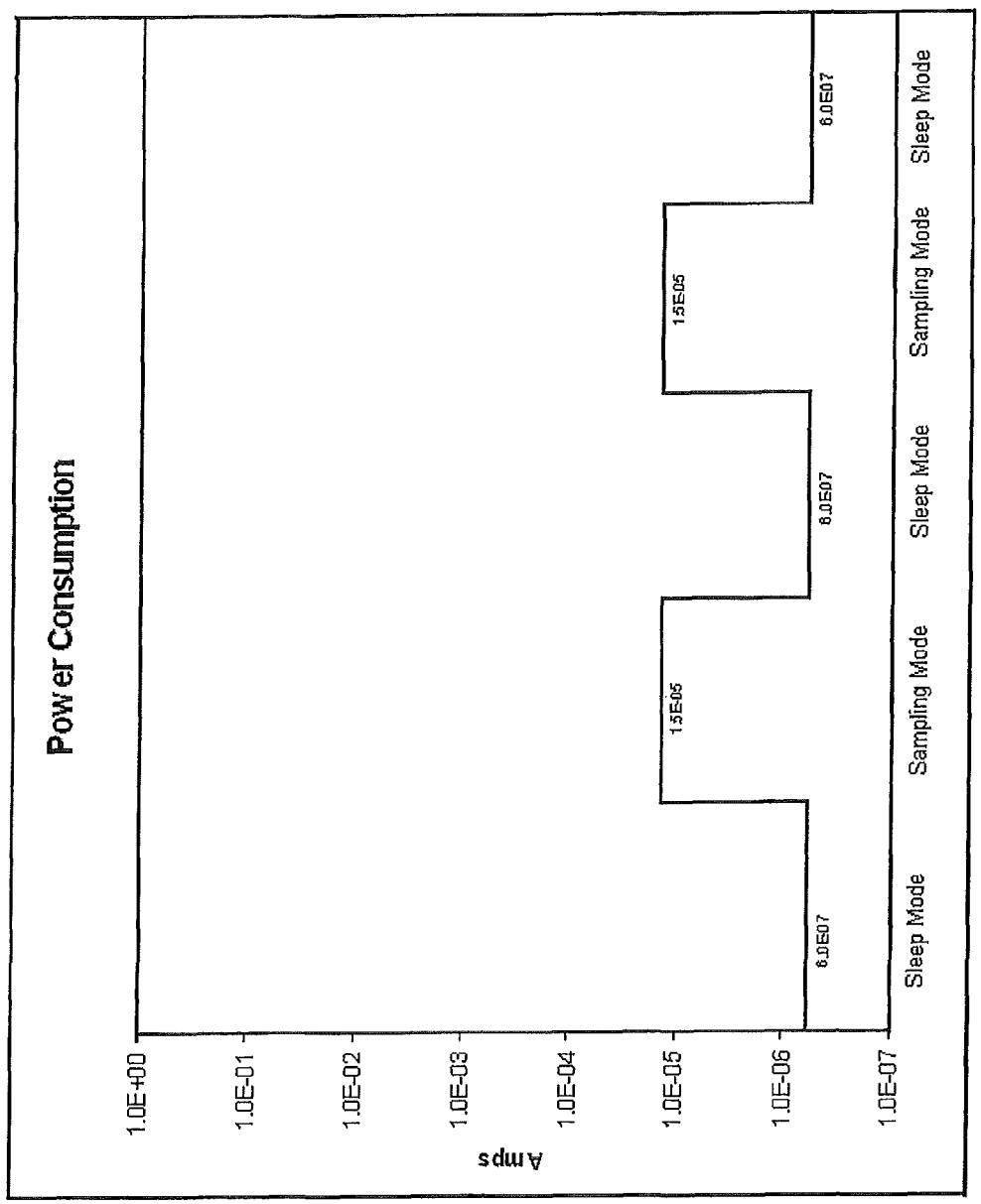
FIG. 6 is a graph of power consumption for a device with a power-saving circuit having a radiofrequency transmission component wherein no motion has been detected.

FIG. 6 illustrates the power consumption of the device 20 when there is no motion detected. In a preferred embodiment, this is when a golf club 50 is in a golf bag and not in use. As shown in FIG. 6, the device 20 transitions from a sleep mode to a sampling mode wherein during the sleep mode less than 600 nano-amps are consumed by the device 20 since the only component operating is the microprocessor 30a, which is operating at a minimal activity. During the sampling mode, the microprocessor 30a becomes more active and the accelerometer 28 is activated to determine if there is any movement or change from the last sampling mode. During the sampling mode, less than 15 micro-amps of power is consumed by the device 20. As shown in this graph, no motion is detected and the device 20 transitions again to the sleep mode.

Figure 7:
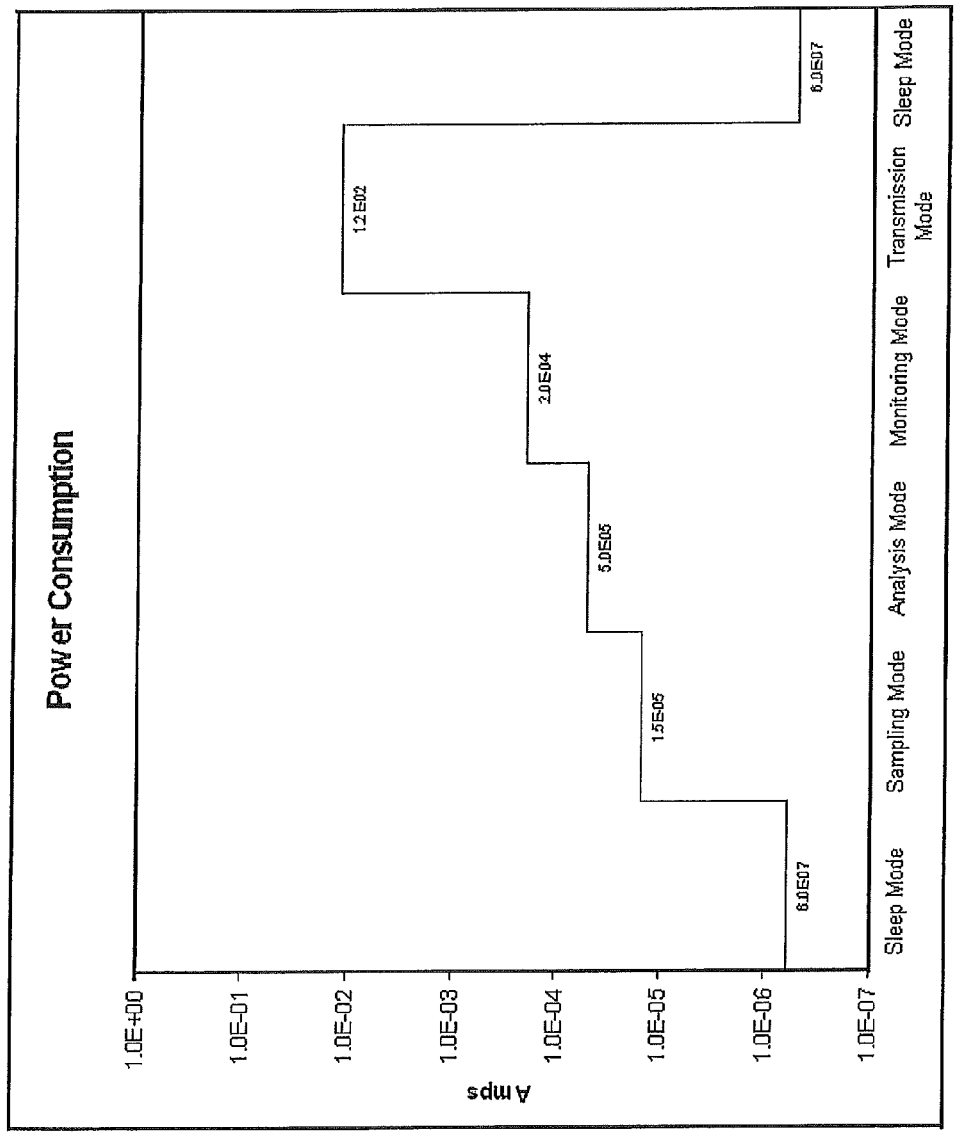
FIG. 7 is a graph of power consumption for a device with a power-saving circuit having a radiofrequency transmission component wherein motion has been detected.

FIG. 7 illustrates the power consumption of the device 20 when there is motion detected. In a preferred embodiment, this is when a golf club 50 is used to strike a golf ball during a round of golf at a golf course. As discussed in reference to FIG. 6, the power consumption begins at the sleep mode and transitions to the sampling mode. However, unlike the scenario in FIG. 6, motion is detected by the accelerometer 28 during the sampling mode. The motion is at least more than a zero g reading by the accelerometer 28. Based on the detected motion, the device 20 transitions to an analysis mode, which consumes less than less than 50 micro-amps of power. During the analysis mode, the microprocessor 30a with input from the accelerometer 28 determines the type of motion. In a preferred embodiment, the device 20, based on the accelerometer readings, determines if the golfer is only taking a practice swing, if the golf club 50 has been removed from the golf bag 61 and is no longer in motion, or more importantly if the golfer is about to strike a golf ball. If the device 20 determines that the golfer is about to strike a golf ball, the device 20 transitions to the monitoring mode which consumes less than 200 micro-amps of power. In a preferred embodiment, during the monitoring mode the device 20 monitors the golfer's swing with the accelerometer 28 fully operable. Once the monitoring mode is completed, which in a preferred embodiment is when the accelerometer 28 has detected the striking of the golf ball, the device 20 transitions to a transmission mode which consumes less than 12 milli-amps. During the transmission mode, the radiofrequency component 30b transmits a signal. The signal comprises data related to the motion activity monitored by the accelerometer 28. Once the transmission mode is completed, the device 20 again returns to the sleep mode and minimal power consumption.

In a most preferred embodiment, in order to conserve power, the microprocessor 30a is configured to deactivate transmissions of the signal when a threshold number of signals are transmitted by the device 20 and a receipt signal is not received by the device 20. The threshold number of signals preferably ranges from 5 to 50, more preferably from 15 to 30 and is most preferred to be 20. Each signal transmitted consumes approximately 2 milliamps of power.

The microprocessor 30a is in electrical communication with the radiofrequency component 30b, wherein a signal 62 is transmitted from the radiofrequency component 30b and a confirmation signal is received at the radiofrequency component 30b, wherein the radiofrequency component 30b preferably operates at 2.4 giga-Hertz. A peak current of transmission of the signal is limited to 2 milliamps.

A method 1000 for shot tracking during a round of golf at a golf course is illustrated in FIG. 5 and explained in conjunction with FIG. 1. At block 1001, a golf club 50 is swung to impact a golf ball during a round of golf. At block 1002, at least one signal is transmitted from a RFID component 30b of a shot tracking device 20 attached to a golf club 50 to indicate that the golf club 50 has been used to strike a golf ball during a round of golf. At block 1003, the signal is received at a receiver 60, which is preferably a GPS device as discussed above. At block 1004, the receiver/GPS device 60 determines the geographical location of the golfer on the golf course and stores the golf club 50 used at that location. For example, if the golfer was teeing off at the first hole with a driver, the receiver/GPS device 60 would record the location as the first hole, the golf club used as a driver, and any other swing performance information provided by the device 20. When the golfer next strikes the golf ball, the device 20 transmits a signal to the receiver/GPS device 60 that the golfer struck the golf ball using a subsequent golf club, for example a six iron.

The receiver/GPS device 60 determines the location on the golf course and from that location determines the distance of the previous shot by the golfer. The process continues for the entire round of golf. Once the round is finished, at block 1005, the receiver/GPS unit 60 uploads the data from the round to a Web site for further processing and display on a personal Web page where the golfer can compare the latest round against previous rounds.

The golf club 50 is any golf club of a set, and preferably every golf club in a golfer's golf bag 61 has a device 20 attached thereto. Further, a resolution of the accelerometer 28 is set to each particular golf club 50. For example, a putter requires a higher resolution than a driver since the movement of the putter during a golf swing is much less than the movement of a driver during a golf swing. In this manner, the device 20 for a putter has an accelerometer 28 set at a high resolution.

In a preferred embodiment of the present invention, the circuit 26 for transmitting a RFID signal 62 while conserving battery power comprises a battery 24 having no more than 225 milliamp hours of power, a microprocessor 30(a) in electrical communication with the battery 24, the microprocessor 30(a) operating during a sleep mode, a sampling mode, an analysis mode, a monitoring mode and a transmission mode. The circuit further comprises a multi-axis accelerometer 30(e) for determining movement, monitoring movement and communicating the movement to the microprocessor 30(a). The circuit further comprising a gyroscope 29, the gyroscope 29 in electrical communication with the accelerometer 28, the gyroscope 29 determining movement, monitoring movement and communicating the movement to the microprocessor 30(a). The multi-axis accelerometer 30(e) is in electrical communication with the microprocessor 30(a). The power for the multi-axis accelerometer 30(e) is drawn from the battery 24. The multi-axis accelerometer 30(e) is only active during the sampling mode, the analysis mode and the monitoring mode. The circuit further comprises a radiofrequency component 30(b) in electrical communication with the microprocessor 30(a), the radiofrequency component 30(b) operating at 2.4 giga-Hertz. The power for the radiofrequency component 30(b) is drawn from the battery 24. The radiofrequency component 30(b) is only operable during a transmission mode, transmitting a signal 62 from the radiofrequency component 30(b) during the transmission mode. The signal 62 comprises data related to the movement monitored by the multi-axis accelerometer 30(e). The circuit is in continuous operation. The circuit consumes less than 600 nano-amps during the sleep mode, the sleep mode having a time period ranging from 5 seconds to 45 seconds. The circuit consumes less than 15 micro-amps during the sampling mode. The circuit consumes less than 50 micro-amps during the analysis mode. The circuit consumes less than 200 micro-amps during the monitoring mode and the circuit consumes less than 12 milli-amps during the transmission mode. The gyroscope operates at or less than 5 milli-amps.

The following patents disclose various golf clubs that may be used with the device of the present invention. Gibbs, et al., U.S. Pat. No. 7,163,468 is hereby incorporated by reference in its entirety. Galloway, et al., U.S. Pat. No. 7,163,470 is hereby incorporated by reference in its entirety. Williams, et al., U.S. Pat. No. 7,166,038 is hereby incorporated by reference in its entirety. Desmukh U.S. Pat. No. 7,214,143 is hereby incorporated by reference in its entirety. Murphy, et al., U.S. Pat. No. 7,252,600 is hereby incorporated by reference in its entirety. Gibbs, et al., U.S. Pat. No. 7,258,626 is hereby incorporated by reference in its entirety. Galloway, et al., U.S. Pat. No. 7,258,631 is hereby incorporated by reference in its entirety. Evans, et al., U.S. Pat. No. 7,273,419 is hereby incorporated by reference in its entirety. Hocknell, et al., U.S. Pat. No. 7,413,520 is hereby incorporated by reference in its entirety.

The measurements may be inputted into an impact code such as the rigid body code disclosed in U.S. Pat. No. 6,821, 209, entitled Method for Predicting a Golfer's Ball Striking Performance, which is hereby incorporated by reference in its entirety.

The swing properties are preferably determined using an acquisition system such as disclosed in U.S. Pat. No. 6,431, 990, entitled System and Method for Measuring a Golfer's Ball Striking Parameters, assigned to Callaway Golf Company, the assignee of the present application, and hereby incorporated by reference in its entirety. However, those skilled in the pertinent art will recognize that other acquisition systems may be used to determine the swing properties.

Other methods that are useful in obtaining a golfer's swing characteristics are disclosed in U.S. Pat. No. 6,638,175, for a Diagnostic Golf Club System, U.S. Pat. No. 6,402,634, for an Instrumented Golf Club System And Method Of Use, and U.S. Pat. No. 6,224,493, for an Instrumented Golf Club System And Method Of Use, all of which are assigned to Callaway Golf Company, the assignee of the present application, and all of which are hereby incorporated by reference in their entireties.

From the foregoing it is believed that those skilled in the pertinent art will recognize the meritorious advancement of this invention and will readily understand that while the present invention has been described in association with a preferred embodiment thereof, and other embodiments illustrated in the accompanying drawings, numerous changes, modifications and substitutions of equivalents may be made therein without departing from the spirit and scope of this invention which is intended to be unlimited by the foregoing except as may appear in the following appended claims. Therefore, the embodiments of the invention in which an exclusive property or privilege is claimed are defined in the following appended claims.

We claim as our invention the following:

1. A circuit for transmitting a RFID signal while conserving the battery power for the circuit, the circuit comprising:
    a battery having no more than 225 milliamp hours of power
    a microprocessor in electrical communication with the battery, the microprocessor operating during a sleep mode, a sampling mode, an analysis mode, a monitoring mode and a transmission mode;
    a multi-axis accelerometer for determining movement, monitoring movement and communicating the movement to the microprocessor, the multi-axis accelerometer in electrical communication with the microprocessor, the power for the multi-axis accelerometer drawn from the battery, the multi-axis accelerometer only active during the sampling mode, the analysis mode and the monitoring mode;
    a gyroscope in electrical communication with the accelerometer, the gyroscope only activated when triggered by the multi-axis accelerometer;
    a radiofrequency component in electrical communication with the microprocessor, the radiofrequency component operating at 2.4 giga-Hertz, the power for the radiofrequency component drawn from the battery, the radiofrequency component only operable during a transmission mode, transmitting a signal from the radiofrequency component during the transmission mode,
    wherein the circuit is in continuous operation;
    wherein the circuit consumes less than 600 nano-amps during the sleep mode, the sleep mode having a time period ranging from 5 seconds to 45 seconds, the accelerometer deactivated during the sleep mode;
    wherein the circuit consumes less than 15 micro-amps during the sampling mode, the microprocessor activating the accelerometer during the sampling mode and the accelerometer determining if there is any movement or change from a last sampling mode;
    wherein the circuit consumes less than 50 micro-amps during the analysis mode, the accelerometer determining if there is motion activity during the analysis mode;
    wherein the circuit consumes less than 200 micro-amps during the monitoring mode, the accelerometer monitoring the motion activity during the monitoring mode and communicating any motion activity to the microprocessor; and
    wherein the circuit consumes less than 12 milli-amps during the transmission mode, the radiofrequency component transmitting a signal during the transmission mode.

2. The circuit according to claim 1 wherein the gyroscope operates at or less than 5 milli-amps.

3. The circuit according to claim 1 wherein the gyroscope is triggered when the multi-axis accelerometer determines there is a backswing.

4. The circuit according to claim 1 wherein the sleep mode has a time period ranging from 10 seconds to 30 seconds.

5. The circuit according to claim 1 wherein the gyroscope is a low-power yaw, pitch and roll digital gyroscope.

6. The circuit according to claim 1 wherein the multi-axis accelerometer is preferably a ultra low-power high-performance 3-axes nano accelerometer.

7. The circuit according to claim 1 wherein the RFID component is a single chip 2.4 gigaHertz transceiver.

8. The circuit according to claim 1 wherein the microprocessor 30a is preferably a low pin count, small-package, 8-bit microcontroller.

9. The circuit according to claim 1 wherein the battery is a CR2032 lithium battery.

10. The circuit according to claim 1 wherein the signal comprises data related to the motion activity monitored by the accelerometer.

11. A method for transmitting a RFID signal while conserving the battery for a circuit in continuous operation, the method comprising:
    activating a microprocessor from a sleep mode to a sampling mode, the microprocessor in electrical communication with a multi-axis accelerometer, a gyroscope, a radiofrequency component, a radiofrequency component, and a battery having no more than 225 milli-amp hours of power;
    activating the multi-axis accelerometer to determine movement during the sampling mode, the power for the multi-axis accelerometer drawn from the battery;
    determining with the multi-axis accelerometer if there is movement during an analysis mode;
    monitoring movement with the multi-axis accelerometer during a monitoring mode and communicating the movement to the microprocessor;
    triggering the gyroscope during the monitoring mode;
    monitoring movement with the gyroscope during the monitoring mode and communicating the movement to the microprocessor; and
    transmitting a signal from the radiofrequency component during a transmission mode, the signal comprising data related to the movement monitored by the multi-axis accelerometer, the radiofrequency component operating at 2.4 giga-Hertz, the power for the radiofrequency component drawn from the battery;
wherein the circuit is in continuous operation;
wherein the circuit consumes less than 600 nano-amps during the sleep mode, the sleep mode having a time period ranging from 5 seconds to 45 seconds;
wherein the circuit consumes less than 15 micro-amps during the sampling mode;
wherein the circuit consumes less than 50 micro-amps during the analysis mode;
wherein the circuit consumes less than 200 micro-amps during the monitoring mode; and
wherein the circuit consumes less than 12 milli-amps during the transmission mode.

12. The method according to claim 10 wherein the gyroscope operates at or less than 5 milli-amps.

13. The method according to claim 10 wherein the gyroscope is triggered when the multi-axis accelerometer determines there is a backswing.

14. The method according to claim 10 wherein the sleep mode has a time period ranging from 10 seconds to 30 seconds.

15. The method according to claim 10 wherein the gyroscope is a low-power yaw, pitch and roll digital gyroscope.

16. The method according to claim 10 wherein the multi-axis accelerometer is preferably a ultra low-power high-performance 3-axes nano accelerometer.

17. The method according to claim 10 wherein the RFID component is preferably a single chip 2.4 gigaHertz transceiver.

18. The method according to claim 10 wherein the microprocessor is preferably a low pin count, small package, 8-bit microcontroller.

19. The method according to claim 10 wherein the battery is a CR2032 lithium battery.

* * * * *